2,796,434

RECOVERY OF GLUTAMIC ACID VALUES

Harold L. Fike, Chicago, Ill., assignor to International Minerals & Chemical Corporation, a corporation of New York No Drawing. Application February 28, 1956,
Serial No. 568,186

15 Claims. (Cl. 260—527)

This invention is concerned with recovery of L-glutamic acid values from raw materials and more particularly with recovery of L-glutamic acid values from fermentation residues such as vinasse or schlempfe.

L-glutamic acid values are conventionally recovered from precursors such as proteins and Steffen's filtrate by hydrolysis of these materials followed by separation of impurities and crystallization of glutamic acid or glutamic acid hydrochloride from solution. Recovery of L-glutamic acid values from by-products such as vinasse, schlempfe or citric acid fermentation residues is not practicable by these procedures.

Processing vinasse or schlempfe alkaline hydrolysates is extremely difficult. For example, hydrolysis of vinasse under alkaline conditions results in a hydrolyzate which is so difficult to filter that the time required for processing is greatly extended and yields and purity of glutamic acid values are low.

Vinasse is a beet sugar fermentation residue which, in a concentrated form, contains between about 10% and about 13% glutamic acid values. Vinasse suitable for glutamate recovery customarily has a solids content between about 60% and about 80%, typically between about 70% and about 75% and usually contains of the order of 50% organic material and about 20% inorganic material.

It is impossible, using conventional procedures for recovery of L-glutamic acid values from precursor compounds, to operate with vinasse or schlempfe in a continuous process. There has been a need for a commercially feasible process for recovering L-glutamic acid values in high yields and high purity from vinasse or schlempfe without using special equipment or complicated procedural steps, and there has been a particular need for a process of this type which could be operated continuously.

It is an object of this invention to recover glutamic acid values from fermentation residues such as vinasse or schlempfe.

It is a further object of this invention to recover glutamic acid values from fermentation residues in high yields and in high purity.

A further object of this invention is to provide a process whereby fermentation residues are hydrolyzed under special conditions which facilitate removal of impurities from the hydrolyzate.

Another object of the invention is to provide a process for recovering high yields of high purity glutamic acid from fermentation residues without using extended periods of time for treatment or processing.

Another object of this invention is to provide a continuous process whereby fermentation residues may be processed to recover glutamic acid values therefrom in high yields and high purities.

This invention will be exemplified by reference to vinasse, but it will be understood that the invention is equally applicable to schlempfe, citric acid fermentation residues or similar materials. The term "glutamic acid" as used herein refers to L-glutamic acid.

In accordance with this invention, vinasse is hydrolyzed under conditions which permit removal of those impurities which interfere with processing of the resulting hydrolyzate. For example, vinasse is hydrolyzed by adding sufficient alkaline earth metal oxide and alkali metal salt of an acid whose salts with alkaline earth metals are substantially more water insoluble than the alkaline earth metal oxide, to produce an aqueous mixture having a pH of at least 12.5. The alkaline earth metal oxide may be added as the hydrated oxide or as the hydroxide. The alkali metal salt is preferably added in an amount at least the chemical equivalent of the alkaline earth metal oxide or hydroxide in order that all alkaline earth metals present in the reaction mixture will be converted to water insoluble alkaline earth metal salts thereby permitting their substantially complete removal from the mixture following hydrolysis. Permissibly, the alkali metal salt may be employed in an amount less than the chemical equivalent of the alkaline earth metal hydroxide in which case not all of the alkaline earth metals in the mixture are converted to insoluble salts and removed by filtration of the hydrolyzate. The alkaline earth metals remaining in the filtrate may then be removed by conversion to an insoluble salt as, for example, the carbonate, sulfite, or the like, by conventional procedures and followed by filtration. Utilization of an amount of alkali metal salt substantially in excess of the chemical equivalent of the amount of alkaline earth metal oxide or hydroxide is avoided as wasteful of the former reagent.

Hydrolysis is effected by heating the alkaline mixture to a temperature of at least about 60° C. and maintaining this temperature for at least about two hours or until hydrolysis is substantially complete. Insoluble solid material comprising an alkaline earth metal salt, formed by the hydrolytic agents and which contains vinasse impurities, may be removed from the hydrolyzate by filtration or by other convenient means. By carrying out the hydrolysis under the conditions above described, filtration of the hydrolyzate is rapid and losses of glutamic acid values are kept at a minimum. This is in contrast to the processing of vinasse by conventional alkaline hydrolysis procedures. Vinasse hydrolyzate which has been hydrolyzed with, for example, sodium hydroxide alone, filters very slowly and the loss of glutamic acid values in the filter cake is high. Filtration of a vinasse hydrolyzate produced by hydrolysis with sodium hydroxide or other conventional alkaline hydrolyzing agents requires about 10 times longer than filtration of a vinasse hydrolyzate produced in accordance with the procedure of this invention.

Following separation of insoluble solid material from the vinasse hydrolyzate, glutamic acid values may be recovered by any of several conventional procedures. In accordance with a specific embodiment of this invention; however, the hydrolyzate is first adjusted to a pH between about 5 and about 7 by the addition of sufficient concentrated inorganic acid, such as hydrochloric acid. Tannin, in the form of a 5%–15% aqueous solution, is added to the adjusted hydrolyzate in an amount of at least ten pounds tannin per ton of solids in the vinasse and preferably, in an amount of at least 25 pounds tannin per ton of solids. A more or less concentrated tannin solution may be utilized. Other precipitating agents such as alkali lignin may be employed in similar amounts. The resulting mixture is agitated for at least about 15 minutes and then filtered to remove the tannin precipitate. Tannin treatment at this point results in the removal of certain unknown solid materials which have a deleterious effect upon filtration and upon processing and recovery of glutamic acid values from the hydrolyzate. Recovery of highest yields of glutamic acid values from vinasse requires treatment with tannin during the processing.

Following separation of the tannin precipitate, the remaining liquor is concentrated to a solids concentration of between about 40% and about 85%, preferably to a solids concentration of between about 65% and 85% whereupon inorganic compounds are removed by any convenient means as, for example, by filtration. Following the separation of inorganic materials, the remaining liquor may be further concentrated if necessary or desired, or may be adjusted to a pH of about 3.2 preparatory to crystallization of glutamic acid therefrom. Adjustment of the pH is effected by the addition of a concentrated inorganic acid such as hydrochloric acid, phosphoric acid, sulfuric acid, etc. Glutamic acid is crystallized and removed from the adjusted solution by conventional procedures.

In accordance with a particularly preferred embodiment of this invention, vinasse is processed by a continuous procedure involving hydrolysis with sufficient sodium carbonate and calcium hydroxide to produce a hydrolysis reaction mixture having a pH above about 13. The reaction mixture is heated for at least two hours and preferably for about 6 hours to effect substantially complete hydrolysis of the vinasse. The resulting hydrolyzate is then filtered to remove solid material such as calcium carbonate and impurities which inhibit filtration of a vinasse hydrolyzate prepared by conventional methods. The filter cake is washed with water to remove residual glutamic acid values, and the wash solution is recycled to the initial hydrolysis station for admixing with fresh vinasse. The washed filter cake comprising calcium carbonate and impurities present in vinasse (yeast cells and degradation products, etc.) is discarded. The hydrolyzate liquor, from which the alkaline earth metal carbonate and impurities have been removed, is then adjusted to a pH between about 5 and about 7, preferably to a pH of about 5.4, and tannin is added in the amount of at least 25 pounds tannin per ton of solids in the vinasse starting material. The resulting mixture is agitated for about one-half hour at room temperature and then filtered to remove the tannin precipitate. The filtrate is then further processed by conventional procedures to recover glutamic acid therefrom. The tannin filter cake is washed with water to remove residual glutamic acid values, and the wash solution is recycled to the initial hydrolysis station where it is admixed with fresh vinasse. By hydrolyzing vinasse under the conditions of this invention, it is possible to operate the process indefinitely on a continuous basis, that is, recycling to the initial hydrolysis station both the wash solution from the alkaline earth metal carbonate solids separation step and the wash solution from the tannin separation step. This is in contrast to the processing of vinasse in accordance with conventional procedures for recovering glutamic acid values from precursor compounds. If vinasse is hydrolyzed with, for example, sodium hydroxide alone, it is impossible to operate the process on a continuous basis even though the hydrolyzate is treated with tannin exactly as outlined above. After only two recycles of wash solutions, filtration of the next hydrolyzate is impossible and no recovery of glutamic acid is effected. Moreover, any glutamic acid recovered prior to complete shutdown of the process is of low purity and is recovered in relatively low yields. If the wash solutions are carried forward as on a batch basis, evaporations are excessive and both yields and purities are low.

Hydrolysis of vinasse in accordance with this invention may be carried out at any temperature above about 60° C. and is preferably conducted at a temperature between about 60° C. and about 100° C. Temperatures above 100° C. may be used if special equipment for carrying out a superatmospheric pressure reaction is available. Hydrolysis at 85° C. is substantially complete after about two hours. At lower temperatures, longer periods of reaction times may be necessary. Hydrolysis should preferably not be extended beyond ten hours due to the tendency of glutamic acid values to racemize, thereby reducing the yields of the desired L-glutamic acid.

The alkali metal salts utilized in this invention are salts of an acid whose salt with an alkaline earth metal is less water soluble than the alkaline earth metal oxide. These alkali metal salts include compounds such as sodium carbonate, potassium carbonate, lithium carbonate, sodium sulfite, potassium sulfite, lithium sulfite, the corresponding bicarbonates, bisulfites and the like.

The alkali metal salt of an acid whose salt with an alkaline earth metal is less water soluble than the alkaline earth metal oxide, for example, sodium carbonate, is added to vinasse, preferably in the form of an aqueous solution. A substantially higher degree of hydrolysis is attained when the alkali metal salt is added as an aqueous solution than when added as a solid. The alkali metal salt is preferably utilized in an amount which is at least the chemical equivalent of the quantity of alkaline earth metal hydroxide utilized and preferably amounts to between about one and about 1.2 equivalents of the alkaline earth metal hydroxide. The alkaline earth metal hydroxide is conveniently added to the vinasse in the form of an aqueous slurry. The total amount of alkali metal carbonate and alkaline earth metal hydroxide should be sufficient to produce a pH of at least about 12.5 and preferably, a pH of at least 13. At pH values lower than about 12.5, hydrolysis reaction times are extended and these lower pH values are, therefore, not desirable.

While it is preferable to employ tannin or tannic acid of a very high degree of purity in this invention, any comparable material which precipitates the organic impurities from a glutamic acid aqueous solution may be used. For example, impure tannic acid or crude tannins, phlobotannins and such compositions as gallotannic acid, digallic acid and others also may be employed within the scope of this invention. Tannin extracts are also acceptable, for example, such extracts as may be obtained by comminution of tannin-bearing material, leaching with water and recovering the extracted solids by evaporation. Synthetic tannins, for example, mono and polygalloylglucose, are also useful. Similarly, any substances which will introduce tannins into the glutamic acid solution under the conditions obtaining are useful in this invention.

Also effective for the precipitation of impurities from a true glutamic acid solution are "alkali lignins." By the term "alkali lignin" is meant lignin which is recovered from lignin-cellulose compositions, for example, either hard or soft woods, bagasse, corn stalks and similar products by digesting them with dilute solutions of alkali metal or alkaline earth metal hydroxides, oxides, carbonates or bicarbonates, for example, dilute aqueous sodium or potassium hydroxide. Such solutions extract the lignin from lignin-cellulose compositions thereby forming alkali metal compounds of lignin which are water soluble. Lignin may be recovered from such alkaline solutions by adding thereto suitable acidic reagents such as mineral acids, for example, sulfuric or hydrochloric acid or organic acids such as acetic or formic acid. The term "alkali lignin" as employed in the specification and claims includes lignin products in their substantially neutral form or in the form of alkali metal salts or alkaline earth metal salts, for example, sodium, potassium, calcium and magnesium salts of alkali-extracted lignins. The term "alkali lignin" does not include lignin which may be produced by the so-called sulfate or kraft process, wherein lignin-cellulose materials are extracted from alkaline solutions containing various sulfate-containing compounds. Such extracts are known in the trade as sulfate lignins and are not suitable in the instant process.

Treatment of glutamic acid-containing solutions with tannin or equivalent compounds is most beneficial if the pH of the solution is between about 2 and about 7. Removal of organic impurities from solution by tannin treatment is most efficient within this range. Separation of organic impurities by tannin treatment at an appropriate pH is most efficient at room temperatures, that is, at temperatures between about 20° C. and about 35° C. These temperatures are not critical, however, since impurity removal with tannin or similar compounds at temperatures which are lower than this range also produces yields of glutamic acid higher than would be obtained in the absence of tannin treatment.

The time of contact of tannin with the organic impurities contained in a glutamic acid solution may be varied widely, for example, between about 5 minutes and about 24 hours. Shorter contact times are effective when high percentages of tannin are employed, but contact time between about one-half hour and about 15 hours is usually employed for precipitation of impurities.

Tannin treatment of relatively concentrated glutamic acid solutions is particularly useful in accelerating filtration rates, but it is equally effective for the precipitation of impurities from relatively dilute glutamic acid solutions. The amount of tannin required is increased in proportion to the quantity of glutamic acid solution being treated. For the sake of economy, it is desirable that the glutamic acid solution have a solids concentration between about 20% and about 60% by weight.

In hydrolyzing vinasse, the hydrolysis reaction mixture ordinarily contains between about 45% and about 65% solids. Additional water may be added, if desired, but there is to be no advantage in operating with a more dilute hydrolysis mixture. Any excess water must later be removed prior to crystallization of glutamic acid and, therefore, it is desirable to operate with as concentrated solution as filtration and handling will permit.

The following example illustrates a specific embodiment of this invention. All parts and percentages are by weight unless otherwise indicated.

*Example*

Vinasse in the amount of about 1000 parts was charged into a reaction vessel and heated to about 60° C. Sodium carbonate in the amount of 215 parts was dissolved in 750 parts of recycle liquors at about 60° C. and the resulting solution added to the heated vinasse. Agitation of the mixture was begun, and 150 parts of calcium hydroxide slurried in 150 parts water was added to the agitated mixture. Hydrolysis of the vinasse was effected by quickly raising the temperature to 85° C. and maintaining this temperature for six hours with agitation. The resulting hydrolyzate was cooled to room temperature and filtered to remove calcium carbonate which had been formed in situ and which contained vinasse impurities. The filter cake was repulped with 450 parts of water, and the repulp water recycled to the hydrolysis station for admixture with a fresh quantity of vinasse. The calcium carbonate mother liquor was adjusted to pH 5.4 by the addition of sufficient 32% hydrochloric acid. One hundred parts of 10% aqueous tannic acid solution was added slowly to the mixture with vigorous agitation and the resulting solution was agitated for about one-half hour and then allowed to stand for an additional one-half hour. The tannin precipitate was removed from the mixture by filtration, and the tannin cake washed with 300 parts of water. The wash water was recycled to the initial hydrolysis step and admixed with fresh vinasse. The tannin filtrate was concentrated to a solids content of about 68% and solution cooled to room temperature. Inorganic compounds precipitated from solution and were removed by filtration. The inorganic cake was washed with 415 parts water, and the wash water recycled to the tannin treatment station. The mother liquor remaining after separation of the inorganic solids was concentrated to a solids content of 82% and adjusted to pH 3.2 by the addition of sufficient 32% hydrochloric acid. Glutamic acid was crystallized from the adjusted solution and recovered by filtration. Recovery of glutamic acid amounted to 78% of the theoretical based upon the quantity of glutamic acid values in the vinasse. The glutamic acid had a purity of 98%. The process was carried through 13 recycles, and it was found that the purity of glutamic acid recovered was maintained in excess of 97% and yields of glutamic acid in each cycle were of the order of 75%.

Following the procedure outlined above, with the exception that sodium hydroxide was utilized to hydrolyze vinasse under conventional conditions and no alkali metal carbonate or alkaline earth metal hydroxide was added, a yield of glutamic acid of 65.3% of the theoretical was obtained in the first cycle, the glutamic acid having a purity of 93.5%. In the second cycle, the yield of glutamic acid was 67.5% of the theoretical and the purity of the glutamic acid was 87.5%. In the third cycle, filtration of the vinasse hydrolyzate was found to be impossible and no glutamic acid was recovered.

Having thus fully described and illustrated the character of the instant invention, what is desired to be secured by Letters Patent is:

1. A process for recovering glutamic acid values from a fermentation residue which comprises hydrolyzing said residue to which sufficient alkaline earth metal oxide and alkali metal salt of an acid, whose salt with the alkaline earth metal is less water soluble than the alkaline earth metal oxide, have been added to produce an aqueous reaction mixture having a pH of at least about 12.5, separating solids from the hydrolyzate and recovering glutamic acid from the remaining liquor.

2. The process of claim 1 in which the fermentation residue is vinasse.

3. The process of claim 2 in which vinasse is hydrolyzed at a temperature of at least 60° C. and the alkali metal salt is in an amount of at least the chemical equivalent of the quantity of alkaline earth metal hydroxide.

4. The process of claim 3 in which the alkali metal salt is present in an amount of between about 1 and about 1.2 chemical equivalents of the quantity of alkaline earth metal hydroxide and insoluble solids are separated from the hydrolyzate by filtration.

5. The process of claim 2 in which the alkaline earth metal hydroxide is calcium hydroxide and the alkali metal salt is sodium carbonate.

6. A process for recovering glutamic acid values from vinasse which comprises heating the vinasse to which sufficient calcium hydroxide and sodium carbonate has been added to produce an aqueous reaction mixture having a pH of at least about 12.5, continuing the heating until the vinasse is substantially hydrolyzed, separating precipitated solids from the hydrolyzate, adjusting the remaining liquor to a pH between about 5 and about 7 by the addition of sufficient inorganic acid, adding tannin to the adjusted liquor, agitating the annin-containing mixture, separating the tannin precipitate from the liquid phase and recovering glutamic acid from the liquid phase.

7. The process of claim 6 in which the vinasse is hydrolyzed at a temperature of at least 60° C. and the calcium hydroxide and sodium carbonate are in sufficient amount to produce a reaction mixture having a pH of at least about 13, said carbonate being in an amount of at least the chemical equivalent of the quantity of hydroxide.

8. The process of claim 7 in which sodium carbonate is present in an amount corresponding to between about 1 and about 1.2 chemical equivalents of the quantity of calcium hydroxide and solids are separated from the hydrolyzate produced by filtration.

9. A process for recovering glutamic acid values from a fermentation residue which comprises heating said residue to which sufficient alkaline earth metal hydroxide and alkali metal salt of an acid whose salts with alkaline earth metals are more soluble than the alkaline earth metal oxide, have been added to produce an aqueous reaction mixture having a pH of at least about 12.5, continuing the heating at a temperature of at least 60° C. until the fermentation residue is substantially hydrolyzed, separating precipitated solids from the hydrolyzate, washing the precipitated solids with water and recycling the resulting wash solution for admixture with fresh vinasse, adjusting the liquor, remaining following separation of said precipitated solids, to a pH between about 5 and 7 by the addition of sufficient inorganic acid, adding tannin to the adjusted liquor in an amount of at least 10 pounds tannin per ton of solids in the vinasse, agitating the tannin-containing mixture, separating the tannin precipitate from the liquid phase, and recovering glutamic acid from the liquid phase.

10. The process of claim 9 in which the fermentation residue is vinasse and the tannin solids, after separation from the liquid phase, are washed with water and the resulting wash solution is recycled for admixture with fresh vinasse.

11. The process of claim 10 in which the alkaline earth metal hydroxide is calcium hydroxide and the alkali metal salt is sodium carbonate.

12. The process of claim 11 in which vinasse is hydrolyzed at a temperature between about 70° C. and 100° C., and solids are separated from the resulting hydrolyzate by filtration.

13. The process of claim 11 in which calcium hydroxide and sodium carbonate are present in sufficient amount to produce an aqueous reaction mixture having a pH of at least 13, the sodium carbonate being present in an amount of at least the chemical equivalent of the quantity of calcium hydroxide, and the reaction mixture is heated to a temperature between about 70° C. and about 100° C. until the vinasse is substantially hydrolyzed.

14. The process of claim 13 in which sodium carbonate is present in the reaction mixture in an amount corresponding to between about 1 and about 1.2 chemical equivalents of the quantity of calcium hydroxide, and solids are separated from the resulting hydrolyzate by filtration.

15. A process for recovering glutamic acid values from vinasse which comprises heating vinasse with sufficient calcium hydroxide and sodium carbonate to produce an aqueous reaction mixture having a pH of at least about 13, said sodium carbonate being in an amount of between about 1 and about 1.2 chemical equivalents of the hydroxide, maintaining the temperature of the heated vinasse between about 70° C. and 100° C. until the vinasse is substantially hydrolyzed, filtering the hydrolyzate to remove precipitated solids, washing the filter cake with water and recycling the resulting wash solution for admixture with fresh vinasse, adjusting the filtrate to a pH between about 5 and about 7 by the addition of sufficient hydrochloric acid, adding tannin to the adjusted filtrate in an amount between about 25 and about 30 pounds tannin per ton of solids in the vinasse, agitating the tannin-containing mixture and separating tannin from the liquid phase by filtration, washing the tannin cake with water and recycling the resulting wash solution for admixture with fresh vinasse, concentrating the tannin filtrate to a solids content of between about 50% and about 85%, separating precipitated solids from the aqueous phase, adjusting the remaining liquor to a pH of about 3.2 by the addition of sufficient hydrochloric acid and crystallizing and recovering glutamic acid therefrom.

No references cited.